United States Patent

Bussing et al.

[11] Patent Number: 5,873,240
[45] Date of Patent: Feb. 23, 1999

[54] PULSED DETONATION ROCKET ENGINE

[75] Inventors: Thomas R. A. Bussing, Issaquah; Thomas E. Bratkovich, Bellevue, both of Wash.

[73] Assignee: Adroit Systems, Inc., Bellevue, Wash.

[21] Appl. No.: 662,858

[22] Filed: Jun. 12, 1996

Related U.S. Application Data

[63] Continuation-in-part of Ser. No. 618,001, Mar. 18, 1996, which is a continuation-in-part of Ser. No. 205,505, Mar. 4, 1994, Pat. No. 5,513,489, which is a continuation-in-part of Ser. No. 45,771, Apr. 14, 1993, Pat. No. 5,345,758.

[51] Int. Cl.$^6$ .................... C06D 5/00; F02K 5/02
[52] U.S. Cl. .................... 60/207; 60/211; 60/225; 60/247; 60/245; 60/39.76
[58] Field of Search .............. 60/204, 205, 207, 60/208, 210, 211, 225, 247, 39.465, 39.38, 39.76, 39.8, 39.81, 224, 244, 245, 25, 257

[56] References Cited

U.S. PATENT DOCUMENTS

| | | |
|---|---|---|
| 1,552,272 | 9/1925 | Carner . |
| 1,731,778 | 10/1929 | Holzwarth . |
| 2,557,198 | 6/1951 | Nichols . |
| 2,684,571 | 7/1954 | Wright ................... 60/247 |
| 2,888,803 | 6/1959 | Pon . |
| 2,930,196 | 3/1960 | Hertzberg et al. . |
| 2,948,112 | 8/1960 | Smith ..................... 60/244 |
| 3,119,436 | 1/1964 | Rydberg ................. 60/39.76 |
| 3,606,867 | 9/1971 | Briffa .................... 60/39.76 |
| 3,756,024 | 9/1973 | Gay ....................... 60/225 |
| 4,510,748 | 4/1985 | Adams . |
| 4,570,438 | 2/1986 | Lorenz . |
| 4,693,075 | 9/1987 | Sabatiuk . |
| 4,787,579 | 11/1988 | Smith ..................... 60/207 |
| 4,807,440 | 2/1989 | Salem . |
| 4,947,641 | 8/1990 | Rodgers . |

(List continued on next page.)

OTHER PUBLICATIONS

Sutton, G.P., "Rocket Propulsion Elements: An Introduction to the Engineering of Rockets," Wiley–Interscience Publications, New York, New York, 1992.

Mattingly, J.D., "Elements of Gas Turbine Propulsion," McGraw–Hill, Inc., New York, undated.

Oates, G.C., Editor, "Aircraft Propulsion Systems Technology and Design," AIAA Education Series, AIAA, Washington, DC, 1989.

Johnson, W., "Analytical and Experimental Study of the Pulsejet Ejector," Ph.D. Dissertation, Department of Mechanical Engineering, University of Clemson, 1967.

Lockwood, R.M. "Interim Summary Report on Investigation of the Process of Energy Transfer from an Intermittent Jet to a Secondary Fluid in an Ejector–type Thrust Augmentor." Hiller Aircraft Corp. Report No. ARD–286, Mar. 31, 1964.

Lockwood, R.M. "Interim Summary Report on Investigation of the Process of Energy Transfer from an Intermittent Jet to a Secondary Fluid in an Ejector–type Thrust Augmentor."

(List continued on next page.)

*Primary Examiner*—Charles G. Freay
*Attorney, Agent, or Firm*—Christensen, O'Connor, Johnson & Kindness PLLC

[57] ABSTRACT

A pulse detonation rocket engine, having at least two detonation chambers. The rocket propelled vehicle includes at least one fuel delivery system in fluid communication with each of the at least two detonation chambers, and at least one oxidant delivery system in fluid communication with the detonation chambers, along with fast-acting valves to inject fuel and oxidant controlledly into the chambers. An ignitor in each of the detonation chambers intermittently initiates detonation of a fuel and oxidant mixture in the chamber, in a controlled cycle, to provide motive force. Also provided is a combined cycle engine, able to operate in air breathing mode, oxidant augmented mode, and as a rocket engine. The combined cycle engine includes at least one detonation chamber, and may include a plurality of such chambers. The invention further provides methods of intermittently detonating sequentially created fuel and oxygen mixtures in these engines, and methods of using these engines.

13 Claims, 13 Drawing Sheets

U.S. PATENT DOCUMENTS

| | | |
|---|---|---|
| 5,085,041 | 2/1992 | Scott-Scott et al. .................. 60/257 |
| 5,191,761 | 3/1993 | Janeke ................................... 60/224 |
| 5,345,758 | 9/1994 | Bussing . |
| 5,353,588 | 10/1994 | Bussing . |
| 5,513,489 | 5/1996 | Bussing ............................ 60/39.76 |

OTHER PUBLICATIONS

Hiller Aircraft Corp. Report No. ARD–305, Jun. 30, 1962.

Clark, L.T., "Application of Compound Flow Analysis to Supersonic Ejector–Mixer Performance Prediction," AIAA Paper 95–0645, 1995.

Bernstein, A., Heiser, W., and Hevenor, C., "Compound–Compressible Nozzle Flow," AIAA Paper 66–663, 1966.

FOA, J.V., "Intermittant Jets", vol. XII High Speed Aerodynamics and Jet Propulsion, 1959.

O'Brien, J.G. "The Pulse Jet Engine A Review of Its Development Potential", Naval Postgraduate School, Jun. 1974.

PULSED DETONATION ROCKET ENGINE

STATEMENT OF RELATED APPLICATIONS

This application is a continuation-in-part of U.S. Ser. No. 08/618,001 filed Mar. 18, 1996, which is in turn a continuation-in-part of Ser. No. 08/205,505 filed Mar. 4, 1994 now U.S. Pat. No. 5,513,489, which is a continuation-in-part of Ser. No. 08/045,771, filed Apr. 14, 1993 now U.S. Pat. No. 5,345,758.

FIELD OF THE INVENTION

The invention relates to intermittent combustion engines wherein the combustion products provide a motive force. More particularly, the present invention provides a pulsed detonation rocket engine, and a pulse detonation combined cycle engine.

BACKGROUND OF THE INVENTION

Aviation engines may be divided into two categories: air-breathing engines; and rocket engines that carry an onboard oxidant as a propellant so that they can operate in environments that have rarefied oxygen supply, or no oxygen. These engine categories may further be subdivided into two classes: deflagrative and detonative combustive engines. Deflagrative engines of the air-breathing type are well known and are typically used in commercial jet airliners, for instance. Additionally, deflagrative rocket engines are commonly used for earth-to-orbit boost, upper stage, station keeping and attitude control applications. In such deflagrative engines, the combustion process produces combustion product gases that are propagated at velocities in the range of a few feet per second. These gases provide motive force for a vehicle to which the engine is mounted.

In contrast, in a denotative engine, such as a pulse detonation engine, motive force is provided by combustion products that result from a detonation process. These flame fronts are propagated at velocities very much higher than the flames of deflagrative processes. Indeed, typical velocities are of the order of several thousands of feet per second for a detonative process. Therefore, it may be expected that pulse detonation engines would have the potential to propel a vehicle at very much higher efficiency than possible with deflagrative engines. The present invention provides a pulse detonation rocket engine that generates sufficient thrust for use in a variety of applications.

SUMMARY OF THE INVENTION

The invention provides pulse detonation rocket engines that may be used in a variety of applications including boosting a vehicle into orbit, serving as an upper stage engine, operating as an orbital transfer engine, and also supplying attitude control of the vehicle. The invention also provides pulse detonation combined cycle rocket engines, that may similarly be used in a variety of applications. The combined cycle engines are able to breath air, when the oxygen content of the air is sufficient to support detonation, and are able to receive an air-oxidant mixture as the air becomes more rarefied, and ultimately function using the onboard oxidant supply, when oxygen from air is too rarefied, or is no longer available.

In accordance with the invention, the pulse detonation engine preferably has at least two detonation chambers. Each of these chambers has an inlet end for receiving a mixture of fuel and an oxidant for the fuel; and an outlet end for expelling denotative combustion product gases from the detonation chamber. The engine has at least one fuel delivery system that is able to supply fuel to the detonation chambers. In some instances, each detonation chamber may have a separate fuel delivery system, while in others a single fuel delivery system may be used to charge fuel sequentially to a plurality of detonation chambers. In addition, in order to operate as a rocket engine, the engine of the invention requires an onboard oxidant delivery system. This onboard oxidant delivery system, like the fuel delivery system, is in fluid communication with each of the detonation chambers. Moreover, while one oxidant delivery system may sequentially serve each of the detonation chambers, it may in some cases be preferable to have more than one oxidant delivery system. To initiate the detonation reaction in each delivery chamber, each chamber is equipped with an ignitor that is able to initiate detonation of fuel and oxidant mixtures in the detonation chamber. A variety of ignitors may be used, including for example, spark discharge ignitors, laser ignitors, arc jet ignitors, plasma torches, and hot combination gases from previous detonation cycles predetonation tubes. Preferably, the engine includes a nozzle in fluid communication with the outlet ends of the detonation chambers, for expelling detonation products and controlling the thrust vector. In certain instances, more than one nozzle may be used, each nozzle serving one or more detonation chambers.

The combined cycle engines of the invention include at least one detonation chamber with an inlet end, and an outlet end for expelling detonated combustion product gases from the detonation chamber. The engine has at least one fuel delivery system, able to supply fuel to the detonation chamber, and at least one oxidant delivery system, able to supply oxidant to the detonation chamber. Moreover, the detonation chamber is adapted to optionally receive air to support the detonation process, either in combination with oxidant supply, or in a pure air breathing mode.

Thus, the combined cycle rocket engine may, for instance, be used to boost a vehicle to such a height that oxygen becomes rarefied, and then gradually convert to utilizing oxidant, from an onboard source, to support detonation. Alternatively, the conversion need not be gradual, but could be triggered when oxygen content drops below a predetermined concentration necessary for efficient detonation. As in the case of the rocket engines of the invention, a variety of ignitors may be used, and the combined cycle engine also preferably includes a nozzle in fluid communication with the outlet ends of the detonation chambers. A single nozzle may be used for a combined cycle engine that includes a plurality of detonation chambers, or each of the plurality of detonation chambers may be equipped with an individual nozzle.

The invention also provides a method of sequentially detonating a fuel and oxidant mixture in a rocket engine. The method includes the steps of sequentially creating a fuel and oxidant mixture in at least two detonation chambers of the rocket engine. The sequentially created fuel and oxidant mixtures are ignited in each of the detonation chambers in a predetermined cycle. Thus, the method provides a controlled sequence of charging the detonation chambers with fuel and oxidant, and igniting the charged fuel and oxidant mixtures. Further, the method of the invention includes sequentially expelling combustion products of the detonation process from the detonation chamber through a nozzle to provide motive force.

The invention furthermore provides a method of utilizing a rocket engine in a combined cycle mode. In this method, a fuel and oxidant mixture is sequentially created in a detonation chamber, or a plurality of chambers in turn, and the fuel and oxidant mixture is ignited in a predetermined sequence, as described above, to provide motive force. However, in the method of using the combined cycle engine, the "oxidant" includes air, that includes a sufficiently high concentration of oxygen to permit the detonation process to take place, when the engine operates in an air-breathing mode. Thus, a combined cycle engine may initially utilize air as an oxidant, and then change modes to utilize an additional oxidant, carried on board the rocket vehicle, when oxygen from air becomes too rarefied. This is the oxidant-augmented mode of operation. The changeover from firing the rocket engines with air, to the use of onboard oxidant, may either be phased in gradually by adding oxidant at a controlled rate to the air supply, or may be abrupt through shutting off the air supply, and converting to the use of only oxidant to support detonation. The latter being a rocket mode of operation.

While the rocket engine, and method, of the invention preferably utilize more than one detonation chamber, a single detonation chamber can also be used under appropriate conditions. Moreover, the combined cycle engines may use from one to a multiplicity of detonation chambers.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 1:
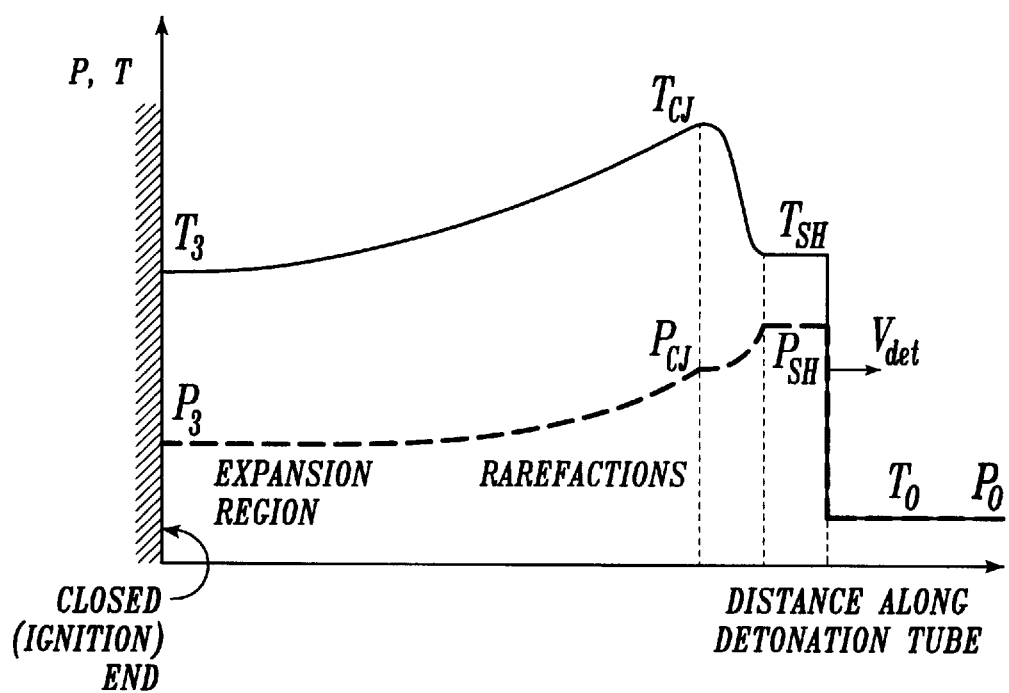
FIG. 1 is an illustrative graphical depiction of a detonation process in a chamber with at least one closed end.

In order to better appreciate the detonative nature of the combustion in the engines of the invention, the principles will be explained with reference to FIG. 1, a snapshot of conditions in a detonation chamber after detonation has been initiated where the horizontal axis is the displacement from the closed end of a detonation chamber, and the vertical axis shows temperature and pressure variation within the chamber. In the detonation chamber, the following conditions exist. At the far right, furthest from the closed ignition end of the detonation chamber, there is a mixture of fuel and an oxidant for the fuel that is still at the initial conditions of pressure and temperature, $P_0$, $T_0$, respectively. However, there is also an advancing wavefront that is propagated at a velocity $V_{det}$. The detonation wave can be considered to consist of a strong shock wave, which triggers combustion, and a thin flame front, or heat addition region, just behind the shock. The shock front moves at the detonation velocity, $V_{det}$ relative to the gas, and increases the pressure and temperature of the gas from its previous values of $P_0$ and $T_0$. An ignition delay region, with length dictated by the reaction chemical kinetics, exists behind the shock. The materials in this wavefront are in a post-shock condition and are at temperature $T_{SH}$, and pressure $P_{SH}$.

The ignition region is followed by a closely coupled flame front which yields combustion products that are in a special thermodynamic state known as the Chapman-Jouguet (CJ) condition. Thus, these products are traveling in the same direction as the wavefront but are at a higher temperature $T_{CJ}$ and lower pressure $P_{CJ}$, than the material in the post-shock condition. The Chapman-Jouguet condition is the only stable state in which the release of chemical energy in a shocked flow results in maintaining the leading shock. It is a fundamental characteristic of the CJ condition that the combustion products travel at a sonic velocity relative to the shock front. In the region of the detonation wave where chemical reaction begins, heat is released and the temperature increases while the pressure decreases from the shock pressure front. The length of this heat addition region is determined by the total time required to complete the fuel and oxidant combustion reaction. In a detonation process, the temperature is higher and the pressure is lower at the end of the heat addition region. As shown in FIG. 1, in a closed end detonation chamber, the detonation has a trailing rarefaction wave that is at a lower temperature and pressure than the CJ condition. The speed of the detonation wave varies according to the chemical reactants present, the initial thermodynamic state (temperature, pressure, mach number, phase) of the fuel and oxidizer mixture. The engines of the invention are pulsed detonation rocket engines that operate in accordance with these principles.

Preferably, the liquid, solid, or gas-fueled engines of the invention are charged with propellants through injectors. During the atomization of liquid propellants (fuels or oxidizers), small droplets of liquid are created at the injectors and these are injected into the detonation chamber. In some embodiments, the propellant injection is controlled and by fast-acting electronically controlled valves that are located to inject propellant into selected sections of each detonation chamber. Examples of such stratified charge injection is shown in our commonly owned U.S. Pat. No. 5,513,489, issued May, 7, 1996, which is hereby fully incorporated by reference to the extent consistent with the present invention. This arrangement allows additional flexibility in stratifying the charge in the detonation chamber; for example, it allows a buffer layer of a fuel-rich zone in the detonation chamber which limits the temperature to which the valve is exposed, and a buffer between hot exhaust gas products and fresh fuel/oxidant change. In other embodiments, when a rotary valve is used to sequentially charge the chambers with fuel, the inlet rotary valve closes (i.e., shuts off the opening of the detonation chamber), flow is momentarily interrupted by a sealing mechanism on the valve face. When the valve opens, atomized fuel again enters into the inlet of the detonation chamber.

To facilitate an understanding of the invention, reference will be made to the accompanying schematic illustrations. It should be understood, however, that these illustrations are merely for the purposes of explanation, and do not limit the scope of the invention. Thus, the invention covers other embodiments that may be different in geometric shape, ancillary equipment, and other details, but that a person of ordinary skill in the technical art will appreciate, after reading this disclosure, falls within the scope of the invention as disclosed and claimed herein.

Figure 2:
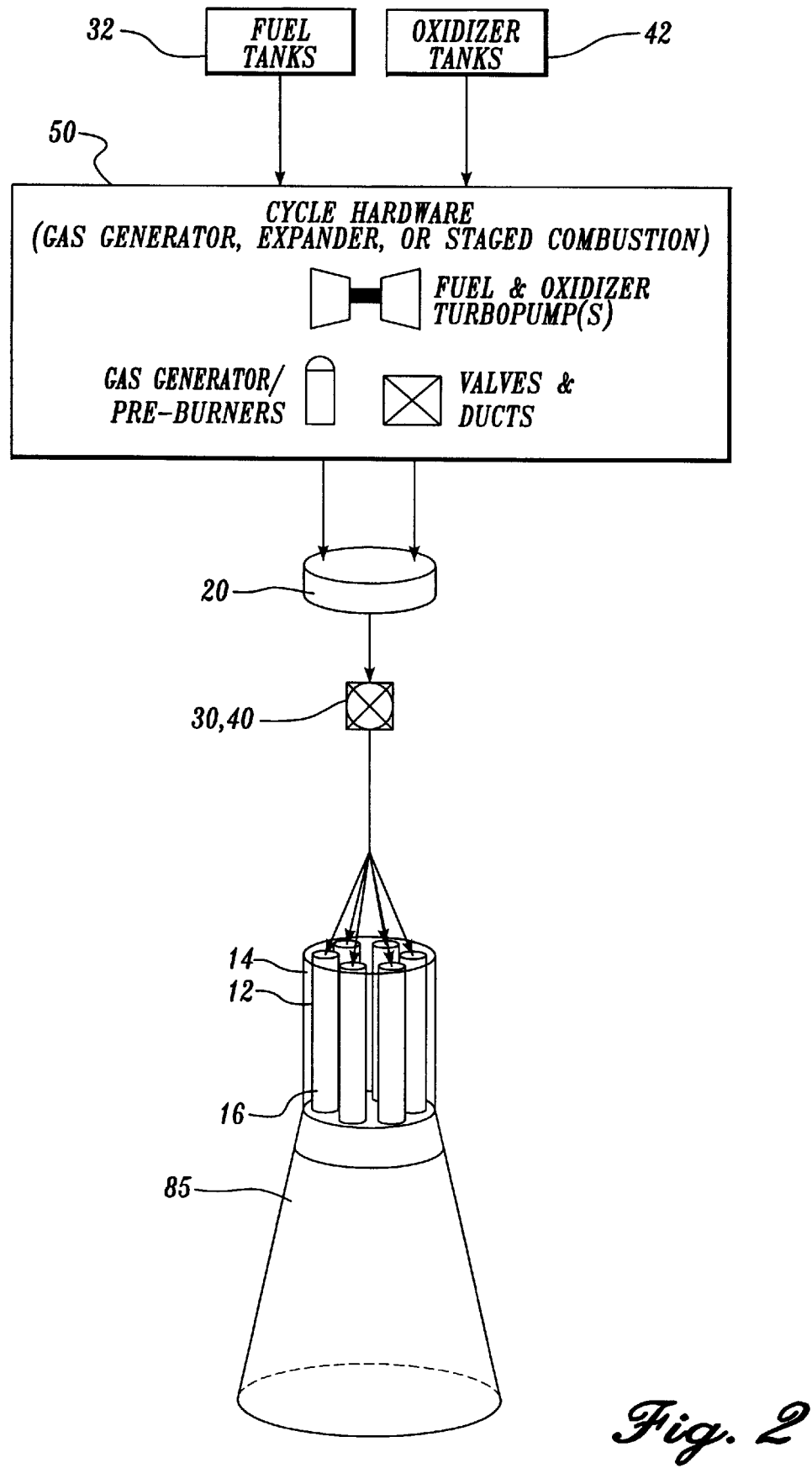
FIG. 2 is a schematic depiction of the major components of a pulse detonation rocket engine, in accordance with the invention.

FIG. 2 is a much-simplified schematic representation of a preferred multiple detonation chamber pulsed detonation rocket engine in accordance with the invention. As shown in this example of the rocket engine 10, the engine comprises six cylindrical detonation chambers 12, although other multiples and shapes are also useful. Preferably, the engine 10 has at least two detonation chambers. Each of the detonation chambers has an inlet end 14 and an outlet end 16. The outlet ends 16 are in fluid communication with a nozzle 85 that directs the thrust vector produced from the detonation combustion gases expelled from the detonation chambers 12. The inlet ends 14 of the detonation chambers 12 are supplied with fuel and an oxidant for the fuel, each supplied through a fuel/oxidant manifold 20 in fluid communication with a series of precise fast-acting, flow-metering valves 30 (fuel) 40 (oxidant). The fuel/oxidant manifold 20 is in fluid communication with the fuel tank 32, and the oxidant tank 42, both stored onboard the vehicle propelled by the rocket engine (not shown). As indicated schematically, in block 50 cycle hardware typical of gas generator, expander, staged combustion, and pressure-fed cycles, as well as other ancillary equipment, may optionally be needed to supply the fuel from the fuel tanks 32 to the manifold 20, and the oxidant from the oxidant tanks 42 to the manifold 20, at suitable conditions of pressure and temperature.

Figure 3:
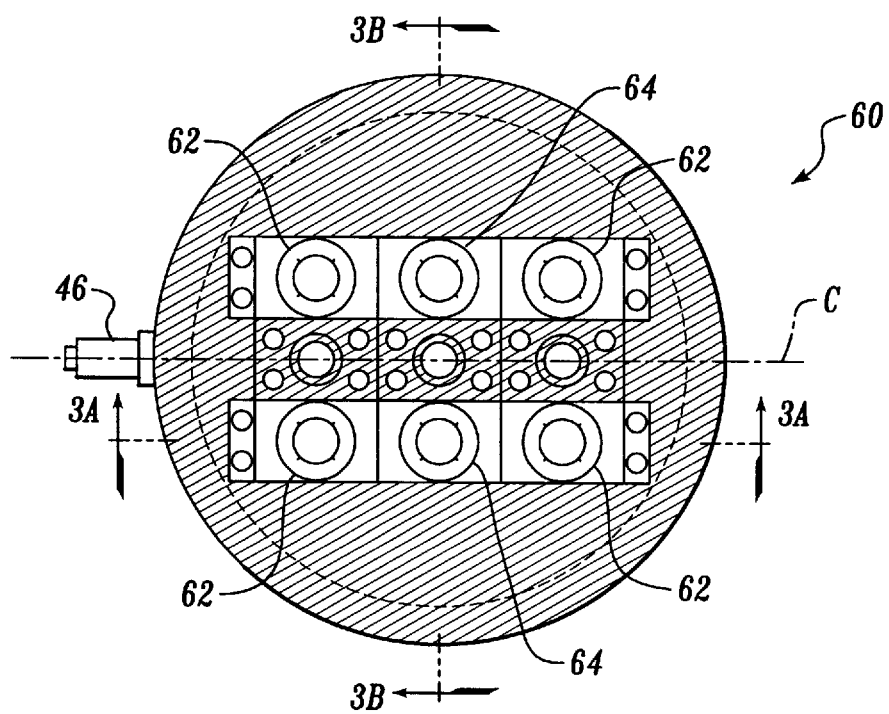
FIG. 3 is a top view of an embodiment of an injector head as attached to the inlet end of a detonation chamber, in accordance with the invention.

FIG. 3 is a schematic diagram of an injector head 60 located at the inlet end 14 of each of the detonation chambers 12. In the example shown, the head is disk-shaped to fit sealingly across this end of the cylindrical chamber 12. While injector heads may have a variety of configurations, the preferred injector head shown in FIG. 3 has a line of symmetry C (corresponding to a diameter of the disk shape) and includes two valves 62 on either side of this line of symmetry for admitting oxidant into the inlet 14 of chamber 12, located such that the four valves 62 are arrayed at the corners of a rectangle. The injector head 60 also includes two fuel-injection valves 64, one located on either side of an axis of symmetry C of the injector head 60 between the pair of oxidant valves 62. This arrangement assists in the mixing of fuel and oxidant as these components are injected into the detonation chamber 12. Clearly, other arrangements are also possible, using other types of valves and/or a different number of valves, depending upon the required propellant mass flow rate and engine thrust. These are all within the scope of the invention.

Figure 3A:
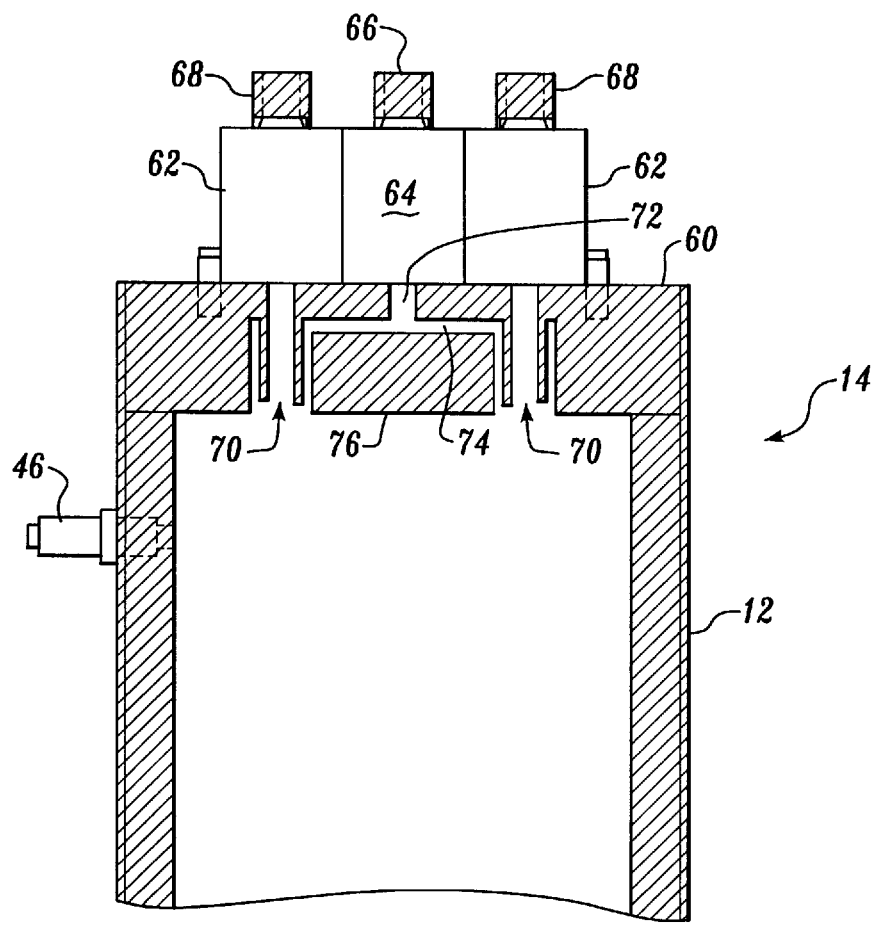
FIG. 3A is a cross-sectional view, taken along A—A of FIG. 3.

A cross-sectional view of the detonation chamber 12 and its injector head along A—A of FIG. 3 is shown schematically in FIG. 3A. The injector head has a series of injection posts in fluid communication with the inlet end 14 of the chamber 12 and either a valve supplying fuel 64, or a valve supplying oxidant 62. In the embodiment shown, a cylindrical channel 70 extends from each of the fast-acting oxidant valves 62 vertically through the injector head 60 into the inlet end 14 of the detonation chamber 12. Oxidant is supplied from the oxidant tank 42 (FIG. 2) through appropriate cycle hardware 50, downcomers 68 to each of valves 62, as shown in FIG. 3B.

In order to facilitate mixing, however, fuel supplied to the fuel injector valve 64 from downcomer 66 is injected from the fuel injector valve 64 into an annular space and thence into the inlet end of the detonation chamber, as shown in FIG. 3A. The annular space is formed by a small diameter cylindrical bore 72, extending from the outer side of the injector head 60, and only partially through the injector head. A larger diameter cylindrical fuel supply bore 74 extends from the center of the bore 72 through the head 60. A cylindrical plug 76, sized so that it is spaced from the walls of the cylindrical bore 74 is inserted into the bore 74 thereby producing an annular space between the walls of the bore 74 and the outer walls of the plug 76 for distribution of fuel into the inlet end 14 of the chamber 12. Again, as pointed out above, other valve arrangements, and use of a different number and type of fast-acting valves, are also within the scope of the invention.

Figure 3B:
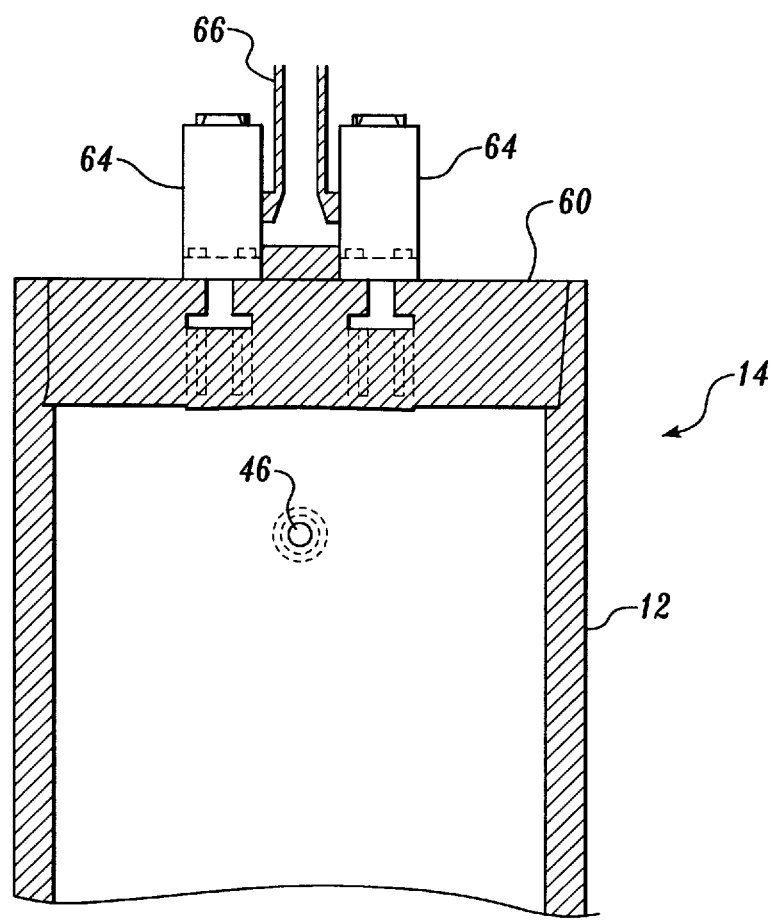
FIG. 3B is a cross-sectional view, taken along B—B of FIG. 3.

Further details of the injector head may be appreciated from FIG. 3B, a schematic cross-section taken along B—B of FIG. 3, through the fuel injector valves. As shown in this schematic diagram, fuel is supplied to each of the valves by a common fuel downcomer 66, located between the valves 64, and in fluid communication with both valves. This fuel is then injected via the valves, through the annular fuel injection space, described above, into the inlet 14 of the detonation chamber 10 where it mixes with injected oxidant and the mixture is ignited by the ignitor 46.

Figure 4:
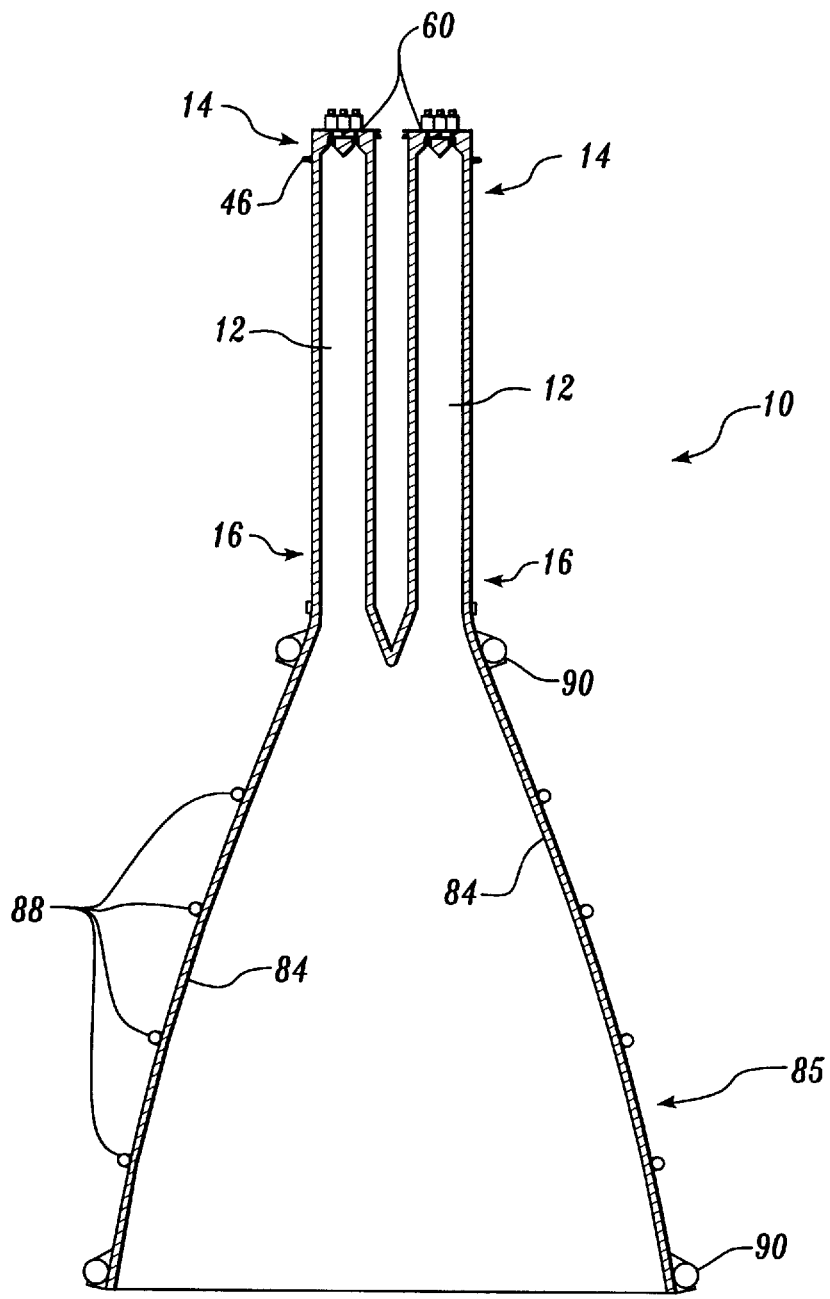
FIG. 4 is a schematic side cross-sectional view of a portion of an embodiment of a rocket engine, in accordance with the invention.
Figure 4A:
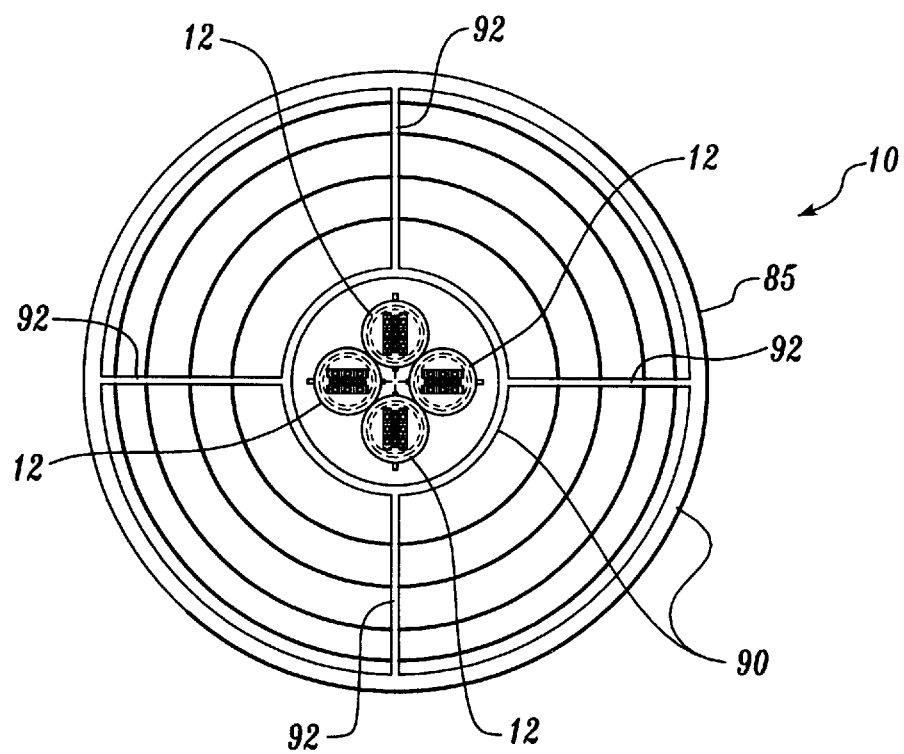
FIG. 4A is a top view of the portion of the rocket engine shown in FIG. 4.

FIG. 4, is a side cross-sectional schematic view of an embodiment of the rocket engine 10 of the invention with four detonation chambers 12, seen more clearly in the top view, FIG. 4A. In this instance, the outlet ends 16 of each of the detonation chambers is in fluid communication with a common well-contoured nozzle 85, either directly or through an optional fast-acting valve. Each detonation chamber 12 is fitted with an individual injector head 60, as described above. The four detonation chambers 12 are sequentially charged with a fuel and fuel/oxidant mixture, and sequentially fired. The combustion gases are expelled through the nozzle, in this instance supplied with regenerative coolant through conduits fed by a ring manifold. The manifold includes a series of fuel-carrying tubes 90 looped around the exterior wall 86 of the nozzle 85. As shown, the tubes 90 extend circumferentially around the outer surface of nozzle 85 and may be interconnected with longitudinally extending fuel tubes 92 on the outer surface of the nozzle, for example, spaced 90° apart around the circumference of the nozzle, as shown in FIG. 4A. Fuel for the rocket engine is pumped through the regenerative coolant ring manifold system, and thence through coolant channels that are integrated with the nozzle and detonation chamber structure (not shown) thereby preheating the fuel while cooling the nozzle. The preheated fuel is then injected into the detonation chambers, as described above. Alternatively, as shown, the nozzle 85 may be lined internally with a thermal protective liner 84, such as an ablative liner, or thermal barrier coating. For maintaining structural integrity, the nozzle 85 may be surrounded by reinforcing spaced circumferential retaining bands 88.

Figure 5:
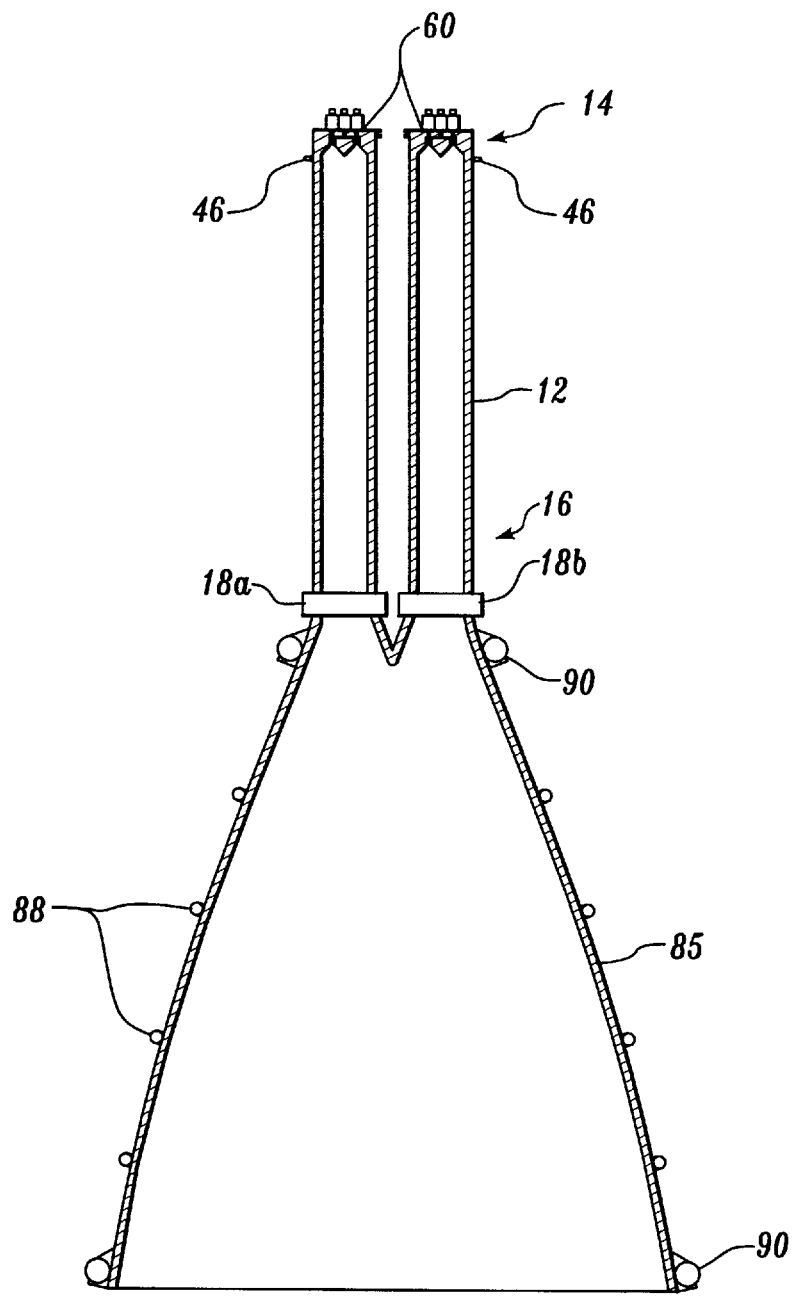
FIG. 5 is a schematic side cross-sectional view, illustrating an embodiment of the pulse detonation rocket engine of the invention, that has fast-acting outlet valves, one for each chamber.

FIG. 5 is a schematic side cross-sectional view of an embodiment of a rocket engine, according to the invention, that has at least two detonation chambers 12, each supplied with a separate fast-acting valve 18a, 18b. This embodiment, like the embodiment described with reference to FIG. 4 above, is a pulse detonation rocket engine. However, while the detonation chambers 12 are in fluid communication with a common contoured nozzle 85, each chamber has a separate fast-acting outlet valve 18, so that the chamber may be intermittently isolated from the nozzle, and any effects from other detonation chambers 12, during the sequential detonation cycle. The fast-acting valves are preferably selected from those valves that have a throat cross-sectional area approximating as closely as possible the cross-sectional area of the detonation chamber in the immediate vicinity of the valve. This permits maximum mass flow rate to be transmitted through the valve, when the valve is open. Examples of such valves include butterfly valves, and other types of fast-acting flapper-type valves. However, rotary valves, ball valves, gate valves, and the like fast-acting valves may also be used.

As shown, the fast acting outlet valves 18A, 18B; spark ignitor 46; and fast acting inlet valves 64, 62 of the injector head 60, are controlled by a digital signal processor 130. For simplicity, this detail is not shown in the other figures.

Figure 6:
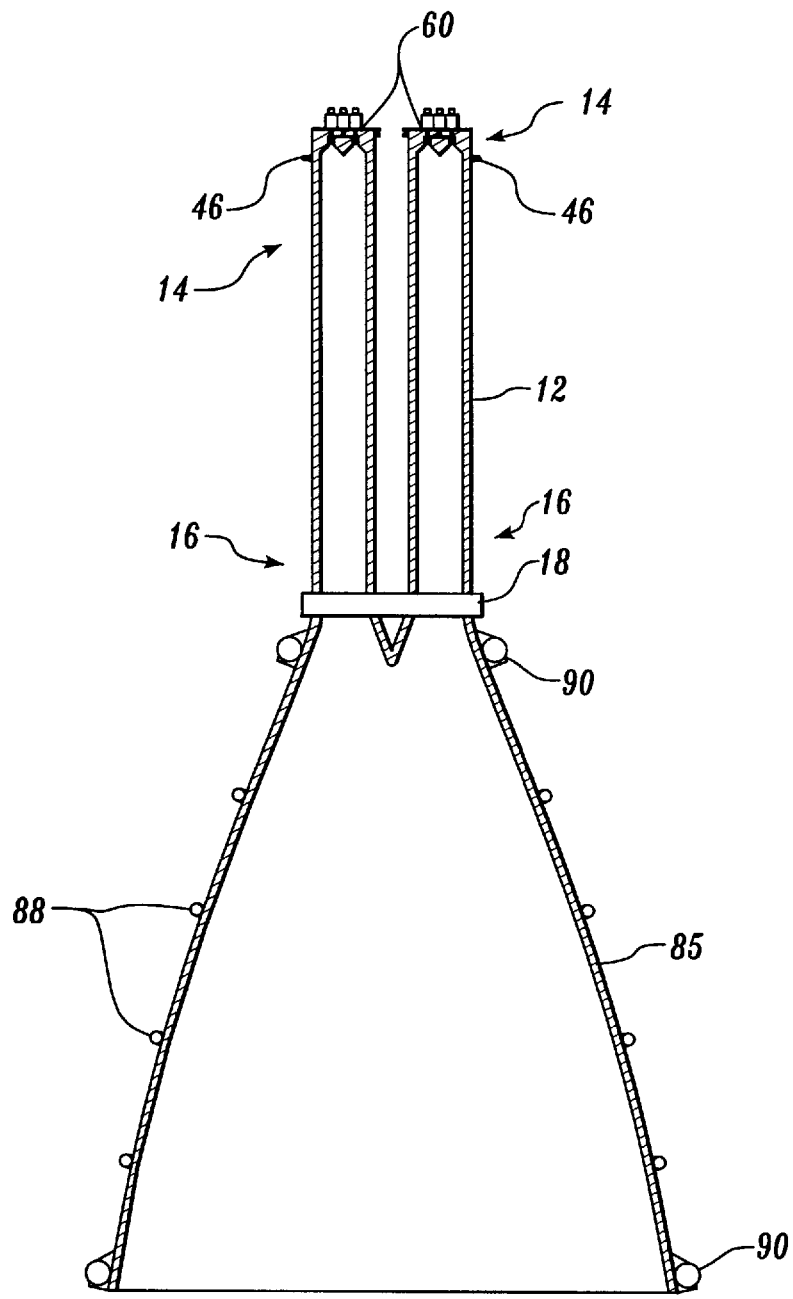
FIG. 6 is a schematic cross-sectional view illustrating another embodiment of the invention that has a single fast-acting outlet valve for a plurality of detonation chambers.

FIG. 6 is a schematic side cross-sectional view of another embodiment of a pulse detonation rocket engine, in accordance with the invention. In this embodiment, that includes at least two detonation chambers, a single fast-acting outlet valve 18 is common to at least two detonation chambers. Thus, for an engine that has four detonation chambers, such as illustrated in FIG. 4, either a single outlet valve 18 may be used for all four detonation chambers, or a pair of outlet valves may be used, each serving two detonation chambers. Other arrangements are also possible depending on the number of detonation chambers and their firing sequence. As explained with reference to FIG. 5, the valve may be selected from a variety of fast-acting valves. However, the valve should be able to operate such that one detonation chamber could be closed, while the other is open, i.e. while the valve may be structurally common to at least two detonation chambers, it should have a multiple opening and closing capability to allow sequential pulse detonation exhaust gas expulsion to take place from the chambers being served.

Figure 7:
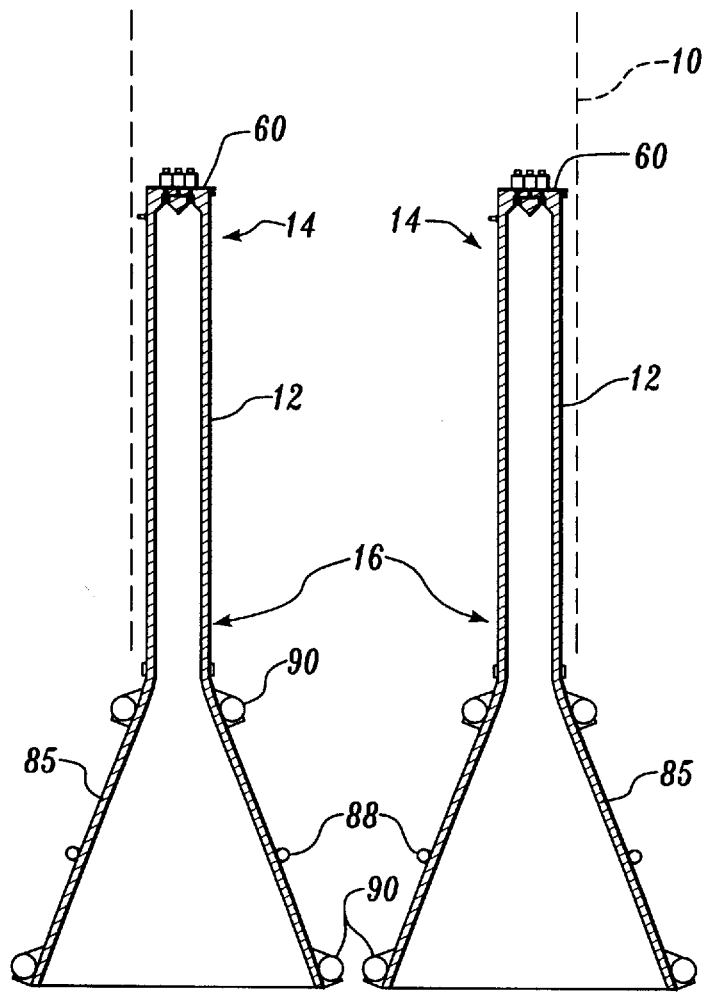
FIG. 7 is a schematic side cross-sectional view illustrating an embodiment of the pulse detonation rocket engine of the invention, that has at least two detonation chambers, each having a separate contoured nozzle.
Figure 8:
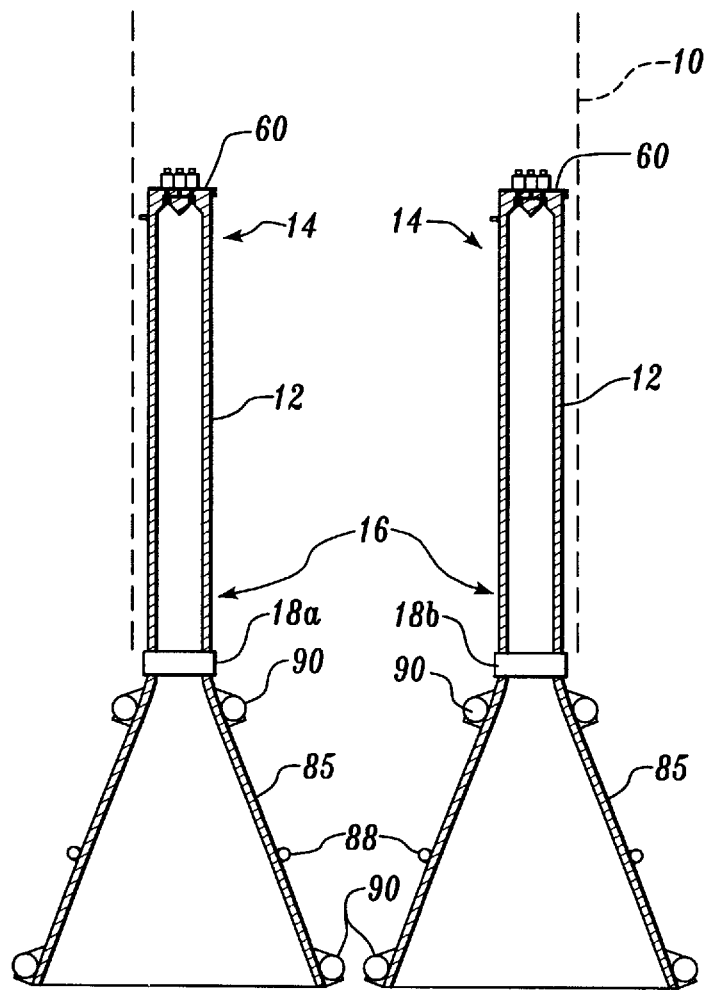
FIG. 8 is a schematic side cross-sectional view, illustrating another embodiment of the pulse detonation rocket engine of the invention, that has at least two detonation chambers, each having a fast-acting outlet valve.

FIG. 7 is a further embodiment of the rocket engine of the invention, seen in schematic cross-sectional side view. In this embodiment, the engine 10 includes two detonation chambers 12, each having a separate contoured nozzle 85. Optionally, as shown in FIG. 8, each of the detonation chambers may further be fitted with separate outlet fast-acting valves, or a single outlet fast-acting valve, as illustrated in FIG. 6. Under certain conditions, the use of separate outlet nozzles 85 for each detonation chamber may be favored over the use of a single contoured nozzle.

Figure 9:
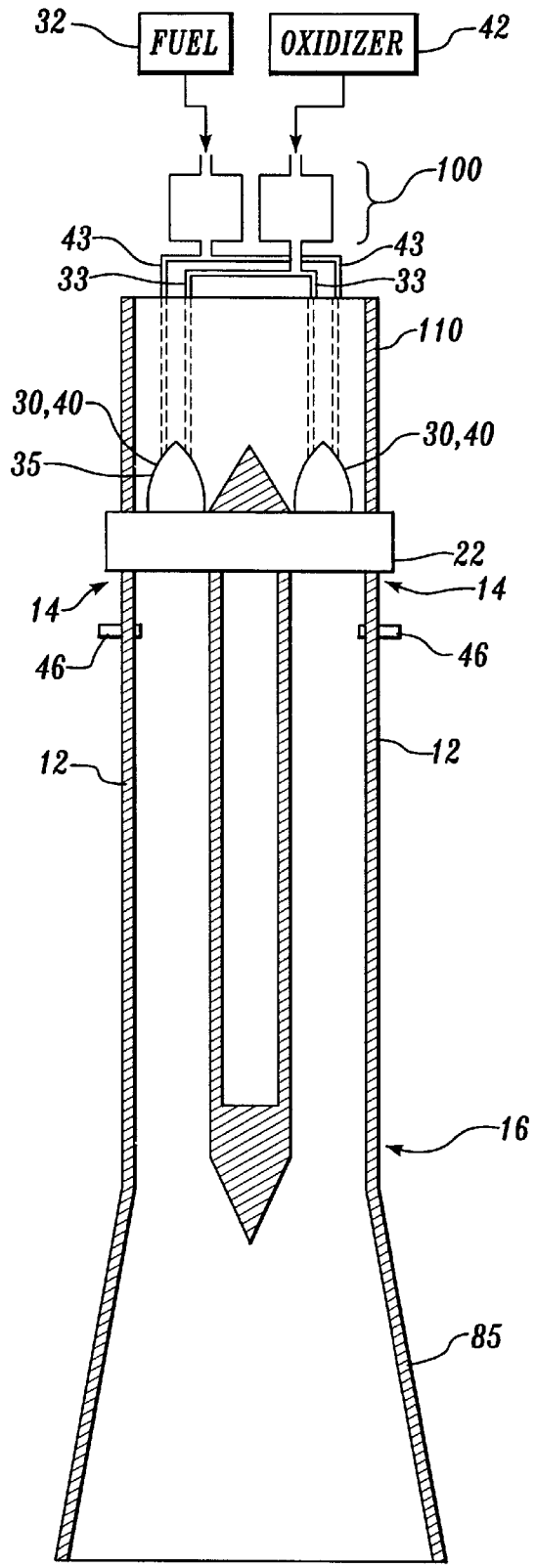
FIG. 9 is a schematic side cross-sectional view of a combined cycle engine, in accordance with the invention, that has a plurality of detonation chambers, each in fluid communication with a single nozzle.
Figure 10:
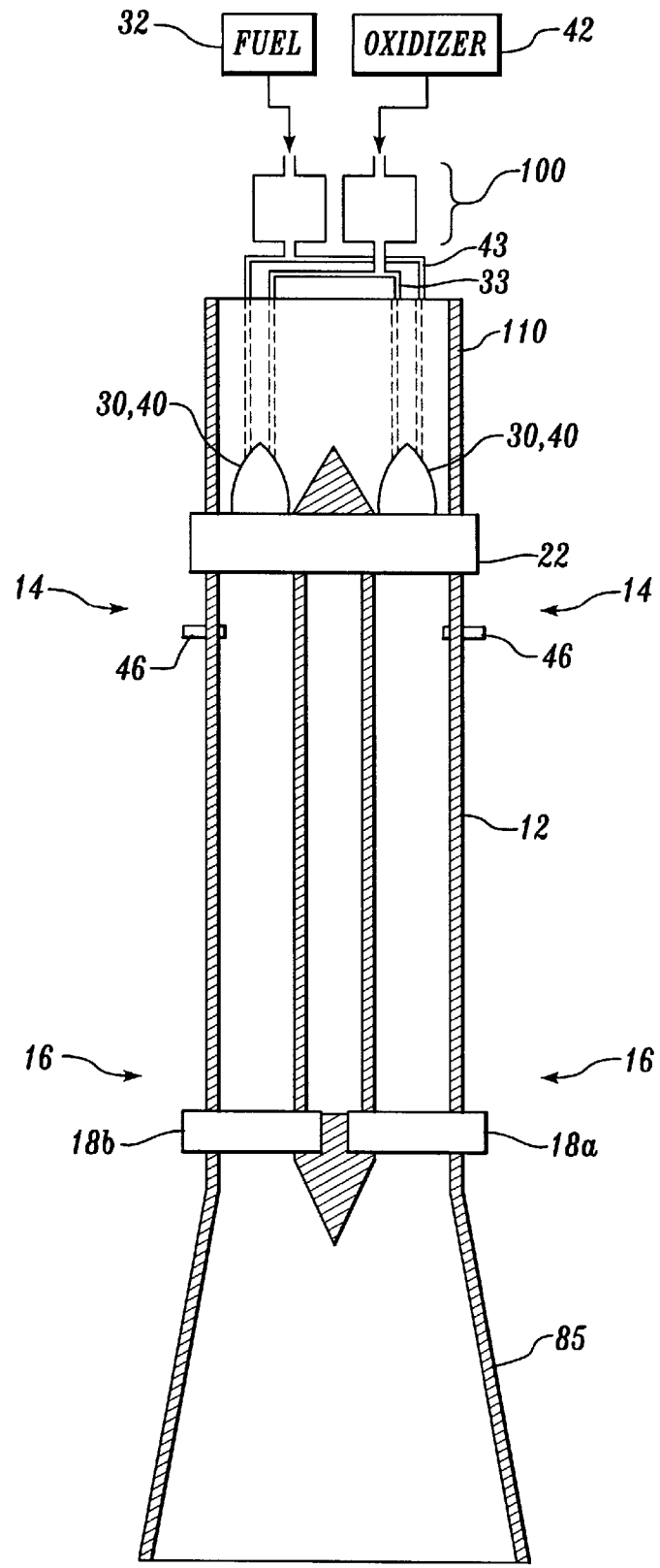
FIG. 10 is another embodiment of the combined cycle engine of the invention, with at least two detonation chambers, each having an outlet fast-acting valve, and each detonation chamber in intimate and fluid communication with a single nozzle through its respective fast-acting valve.

The combined cycle rocket engine of the invention is exemplified in FIGS. 9 and 10. Clearly, the combined cycle engine is not limited to these two embodiments, that schematically illustrate, in side cross-sectional view, the essential details of the engine. As shown, fuel is supplied from an onboard source 32 into a plenum 100. Likewise, oxidant is supplied from an onboard oxidant source 42 to the plenum 100. From this plenum 100, the fuel and oxidant are supplied in separate conduits, 43 and 33, respectively, to fast-acting fuel inlet valves 30, and fast-acting oxidant inlet valves 40. These valves are controlled to operate intermittently to inject a fuel and oxidant mixture into the detonation tubes 12, when the rocket is operating in a "rocket mode". On the other hand, when the engine operates in an air breathing mode, air is conveyed to the inlet 14 of the detonation chamber 12 by the inlet air manifold 110, shown as surrounding the extreme upper ends of the detonation chambers 12 and encompassing the fast-acting valves 30 and 40. Air is charged through the combustor air valve 22 sequentially into each of the detonation chambers 12. Fuel is injected through the fast-acting fuel injector valves 30. Thus, by synchronizing and controlling the intermittent injection of fuel and air, a fuel/air mixture is created in each detonation chamber 12 sequentially. This fuel/air mixture is then ignited by an ignitor 46 to initiate the detonation process. The combustion product, including the high-speed flame front, travels down the length of the detonation tube 12, exiting from its outlet end 16, into the nozzle 85, to provide motive force.

In accordance with the invention, the combined cycle engine is also able to operate in an oxidant augmented mode. Thus, when the oxygen supply from air becomes rarefied, or when it is desired to add additional oxidant to the fuel/air mixture in the detonation tubes, oxidant may be injected through the above-described system, and fast-acting valves 40, along with an air supply injected through the air valve 22. Clearly, the amount of oxidant injected may be controlledly varied to achieve a desired concentration of total oxidant (oxygen from air plus injected onboard oxidant) relative to fuel, or a desired mass of oxidant in each detonation chamber. Ultimately, when it no longer becomes efficient to use air to provide oxygen for the detonation process, the combustor air valve 22 may be shut off so that only the onboard oxidant is injected, through the above-described system, intermittently into the detonation chambers 12.

FIG. 10 is an embodiment of the combined cycle engine of the invention, as shown in FIG. 9, but with at least one fast-acting outlet valve 18. As shown, each detonation chamber 12 has a separate outlet valve 18a, 18b. However, the fast acting outlet valves may serve more than one detonation chamber 12, and indeed a single fast-acting outlet valve may be used to serve all of the detonation chambers. As discussed above, with reference to the rocket engines of the invention, the fast-acting outlet valves may be selected from a variety of available fast-acting type valves. The selection criteria are essentially the same as for the rocket engines, as are the preferred valves.

In an additional feature of the rocket or combined cycle engine, a buffer zone 120 may be created between sequential fuel and oxidant charges as exemplified in FIG. 10. This buffer zone 120 may be created from the combustion products from associated cycle machinery on board the rocket propelled vehicle, that is injected intermittently into each detonation chamber between sequential fuel and oxidant charges or the buffer zone may be created from pure fuel, pure oxidant, or an onboard buffer/diluent-composition, as appropriate.

The invention also provides a method of producing a pulsed detonation motive force. This method includes charging fuel and oxidant into the inlet end of one of at least two detonation chambers sequentially. A fuel and oxidant mixture is formed within the chamber, and the inlet end of the detonation chamber is then closed. The other end of the detonation chamber, if previously closed, is now opened. The fuel-oxidant mixture in the chamber is detonated thereby providing combustion gases and a flame front that travels at several thousands of feet per second. This propels the engine while the combustion gases are expelled from the open outlet end of the chamber. While this detonation was being initiated, another chamber was being charged with fuel and oxidant in a predetermined sequence. After detonation, the inlet end of the chamber is then again opened to receive a next charge of fuel and air, while the charge in the other chamber is detonated, and the cycle is repeated.

As explained above, the method of the invention includes controlling the detonation of the fuel and oxidant mixture by sensing the position of the valve at the inlet end of the detonation chamber, and also the valve at the outlet end of the chamber, in the event the chamber has two valves. The timing sequence of fuel injection, ignition, and oxidant metering into the detonation chamber is then controlled by a controller, such as a programmable digital signal processor, to optimize the firing cycle of the engine.

The invention also provides a method of operating a combined cycle engine, that includes intermittently detonating a mixture of fuel and an oxidant in a single detonation tube, or a plurality of detonation tubes in sequence. In the case of the combined cycle engine, the oxidant may be either a pure oxidant from an onboard source (rocket mode), or the oxidant may be air supplied from surrounding atmosphere (air breathing mode), or the oxidant may be a mixture of oxygen from surrounding atmosphere and oxidant from an onboard source (oxidant augmented mode). Thus, in the air breathing mode, fuel and air are injected sequentially into each detonation chamber of the rocket engine and the mixture is ignited in a predetermined cycle to produce a sequence of pulse detonations that propel the engine. In the oxidant augmented mode, the same sequence takes place, except that the "oxidant" is a mixture of pure oxidant and air containing oxygen, from the surrounding atmosphere. Finally, the rocket mode is as described above. Control of oxidant injection in the oxidant augmented mode and in the rocket engine mode may be effected by oxidant sensors in communication with electronic controls, utilizing a digital signal processor, to control fast-acting valves to accurately and rapidly meter the oxidant amount. Moreover, the oxidant and fuel may each be injected at a number of predetermined locations into the detonation tube, to provide a stratified fuel/oxidant charge, as required, for certain applications.

The engines of the invention may be used to boost a vehicle into orbit, adjust the attitude of a vehicle, serve as the upper stage engine of a vehicle, or serve as an orbital transfer engine. Indeed, the engines are highly versatile and may be adapted for a variety of services where conventional aviation engines are currently used, by selecting the appropriate number and size of detonation chambers, coupled with an appropriate fuel and oxidant. As indicated before, the fuels may be selected from the solid, liquid and gaseous fuels commonly used to fuel rocket engines. The oxidants may likewise be selected from gaseous, liquid and solid oxidants.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, any means-plus-function clauses are intended to cover the structures described herein as performing the recited function, and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may nevertheless be equivalent structures.

The embodiments of the invention in which an exclusive property or privilege is claimed are defined as follows:

1. A method of sequentially detonating a fuel and oxidant mixture in a rocket engine, the method comprising:
   (a) commencing a pulse detonation cycle by creating a detonable fuel and oxidant mixture in a first of a plurality of detonation chambers of a rocket engine, by controlling the amount of fuel supplied by a fuel injector, and supplying an amount of oxidant sufficient to produce a detonable fuel-oxidant mixture to the chamber;
   (b) igniting the fuel and oxidant mixture in the first detonation chamber to cause a detonation;
   (c) expelling combustion products of the detonation from the detonation chamber through a nozzle;
   (d) creating a buffer composition in the first detonation chamber after igniting a fuel and oxidant mixture from a previous cycle and before commencing a next pulse detonation cycle; and
   (e) controlling timing sequence of oxidant and fuel injection, and ignition by a programmable digital signal processor;
   whereby continuous pulsed detonation is achieved by performing steps (a) through (d) in a predetermined sequence under control of the digital signal processor for each of the plurality of detonation chambers, and by repeating the cycle commencing with step (a) for the first detonation chamber.

2. The method of claim 1, further comprising using expelled combustion products of step (c) to control an attitude of a craft propelled by the rocket engine.

3. The method of claim 1 further comprising preheating the fuel for the step of sequentially creating a fuel and oxidant mixture by flowing the fuel through walls of the nozzle.

4. The method of claim 1, wherein the step (b) of igniting comprises commencing to ignite the fuel and oxidant mixture in a closed first detonation chamber; and wherein the step (c) of expelling combustion products from the first detonation chamber is constrained to commence after detonation of the fuel and oxidant mixture is initiated.

5. The method of claim 1, wherein the creating of the buffer composition comprises injecting a buffer composition into the first detonation chamber after commencing the step (c) of expelling combustion products from the chamber and before commencing step (a) of creating a fuel and oxidant mixture in said first chamber in a next cycle.

6. The method of claim 5, wherein the injecting of a buffer composition comprises injecting a composition selected from the group consisting of fuel, oxidant and combustion product gasses.

7. The method of claim 6, wherein the step of creating a fuel and oxidant mixture comprises creating the mixture in a first detonation chamber having a closed outlet end.

8. The method of claim 1, wherein the creating of the buffer composition comprises injecting a fuel-rich buffer composition into the first detonation chamber after commencing step (c) of expelling combustion products and before commencing step (a) of a next cycle of creating a fuel and oxidant mixture in the first detonation chamber.

9. A method of operating a combined cycle pulse detonation engine, the method comprising:

(a) creating a fuel and air mixture in a detonation chamber of the rocket engine, the air containing a sufficient concentration of oxygen to support detonation;

(b) igniting the fuel and air mixture in the detonation chamber to cause a detonation;

(c) injecting a buffer composition into the detonation chamber while expelling combustion product gases produced by the step of igniting;

(d) repeating steps (a), (b) and (c) in a predetermined sequence under control of a programmable digital signal processor, the processor also controlling steps (a) (b) and (c);

(e) closing off a supply of air to the detonation chamber of the rocket engine, when the concentration of oxygen is insufficient to support the detonation process; and (f) after closing of the air supply, sequentially creating, under control of the digital signal processor, a fuel and oxidant mixture in the detonation chamber, the oxidant supplied from an onboard source of oxidant, and detonating the created fuel and oxidant mixture.

10. A method of operating a pulse detonation engine in an oxidant augmented mode, the method comprising:

(a) creating a fuel and oxidant mixture in a detonation chamber of the rocket engine, the oxidant mixture comprising a mixture of air including a concentration of oxygen, and an oxidant supplied from an onboard source of oxidant;

(b) igniting the fuel and oxidant mixture in the detonation chamber to cause a detonation;

(c) injecting a buffer composition into the detonation chamber while expelling combustion products of the detonation from the detonation chamber; and (d) repeating steps (a) through (c), carried out under control of a programmable digital signal processor, in a predetermined sequence.

11. The method of claim 10, wherein the buffer composition is selected from pure fuel, pure oxidant, cycle combustion product gases, and an onboard buffer composition.

12. A method of operating a combined cycle pulse detonation engine, the method comprising:

(a) creating a fuel and air mixture in a detonation chamber of the engine, the air containing a sufficient concentration of oxygen to support detonation;

(b) igniting the fuel and air mixture in the detonation chamber to cause a detonation;

(c) creating a buffer composition in the detonation chamber after igniting a fuel and oxidant mixture from a previous cycle and before commencing a next pulse detonation cycle;

(d) repeating cycles of steps (a), (b) and (c) in a predetermined sequence under control of a programmable digital signal processor;

(e) gradually closing off a supply of air to the detonation chamber of the engine, when the concentration of oxygen becomes insufficient to support the detonation process and supplementing the oxygen with a sufficient amount of an oxidant to maintain a fuel-oxidant ratio enabling detonation of the mixture upon ignition; and (f) after completely closing off the air supply, under control of the digital signal processor, creating successive detonable fuel and oxidant mixtures, alternating with buffer compositions, in the detonation chamber and igniting these mixtures to continue pulse detonation combustion.

13. A method of detonating fuel and oxidant mixtures in a rocket engine, the method comprising:

(a) commencing a pulsed detonation cycle, in a first detonation chamber of a multi-chamber pulsed detonation rocket engine, by injecting a predetermined amount of fuel into an inlet end of the chamber, and supplying an amount of oxidant sufficient to produce a detonable fuel-oxidant mixture to the chamber;

(b) maintaining the fuel-oxidant mixture in the detonation chamber by back pressure of combustion product gasses from a preceding detonation in the chamber;

(c) igniting the fuel-oxidant mixture to cause a detonation producing combustion product gasses;

(d) expelling the produced combustion product gasses from an outlet end to the chamber by pressure caused by expansion of said gasses;

(e) injecting a buffer composition into the inlet end of the detonation chamber, to form a layer between the combustion product gasses being expelled in step (d) and the inlet end of the chamber; and (f) performing steps (a) through (e) for each of the chambers of the multi-chamber rocket engine in a predetermined sequence controlled by as programmable digital signal processor, and recommencing the pulsed detonation cycle with step (a), the recommencing of the cycle beginning before completion of the performing of steps (a) through (e) for each of the chambers of the multi-chamber rocket engine under control of the processor.

* * * * *

UNITED STATES PATENT AND TRADEMARK OFFICE
CERTIFICATE OF CORRECTION

PATENT NO. : 5,873,240
DATED : February 23, 1999
INVENTOR(S) : T.R.A. Bussing et al.

It is certified that error appears in the above-identified patent and that said Letters Patent is hereby corrected as shown below:

```
On the title page

[54]        Title      "PULSED" should read --PULSE--
Pg. 1, col. 1

11          23        "closing of" should read --closing off--
(Claim 9,    line 18)

12          45        "by as" should read --by a--
(Claim 13,   line 23)
```

Signed and Sealed this

Thirty-first Day of August, 1999

Attest:

Q. TODD DICKINSON

*Attesting Officer*     Acting Commissioner of Patents and Trademarks